United States Patent [19]

Chishima

[11] Patent Number: 5,295,026
[45] Date of Patent: Mar. 15, 1994

[54] MAGNETIC DISK DRIVE
[75] Inventor: Takeshi Chishima, Furukawa, Japan
[73] Assignee: Alps Electric Co., Ltd., Tokyo, Japan
[21] Appl. No.: 874,938
[22] Filed: Apr. 28, 1992
[30] Foreign Application Priority Data
  May 10, 1991 [JP]  Japan .................................. 3-133176
[51] Int. Cl.⁵ ............................................. G11B 5/596
[52] U.S. Cl. .................. 360/77.08; 360/78.12
[58] Field of Search ................ 360/77.08, 78.12, 77.02
[56] References Cited

U.S. PATENT DOCUMENTS 3,156,906  11/1964  Cummins ........................ 360/77.08
4,967,291  10/1990  Touchton et al. .
5,140,476   8/1992  Kim ................................ 360/77.02

Primary Examiner—Edward K. Look
Assistant Examiner—Christopher Verdier
Attorney, Agent, or Firm—Guy W. Shoup; Patrick T. Bever

[57] ABSTRACT

The present invention provides a magnetic disk drive for recording data on and reproducing recorded data from magnetic disk having a servocontrol data zone in which servocontrol data is stored. The magnetic disk drive includes a magnetic head shifting device for shifting a magnetic head unit radially with respect to the magnetic disk, and a voice coil motor for driving the magnetic head shifting device. A control means controls the voice coil motor so as to decelerate the magnetic head shifting device to a stop when a failure to read servocontrol data occurs a predetermined number of times while the magnetic head shifting device is being driven during a target track seek operation. Thus, a collision of the magnetic head unit against the magnetic disk can be prevented.

2 Claims, 4 Drawing Sheets

MAGNETIC DISK DRIVE

BACKGROUND OF THE INVENTION

1. Field of the Invention

The present invention relates to a magnetic disk drive and, more particularly, to a magnetic disk drive capable of servo control operation on the basis of servo control data stored previously in a magnetic disk.

2. Description of the Prior Art

A hard disk drive, which is one type of magnetic disk drive, includes a magnetic disk, consisting of a hard, metallic disk (typically referred to as a hard disk) upon which is formed a magnetic recording layer, and a magnetic head for recording information onto reproducing information from the magnetic disk. The magnetic recording layer is divided into a plurality of storage locations which are arranged in number of concentric tracks. Because the tracks are closely spaced in high track density hard disks, servocontrol data is typically provided on the magnetic recording layer to help position the magnetic head over a target track during a seek operation in order to perform recording or reproducing operations on the target track. As shown in FIG. 3, a magnetic disk 1 has a flotation security region 2 formed in a magnetic layer forming area on the surface thereof. The flotation security zone 2 has, in a sequential arrangement from the inner circumference outward, an inner guard band 3, a contact start/stop zone (hereinafter, referred to as "CSS zone") 4 in which no data is recorded and against which a magnetic head is parked when the magnetic disk is not spinning a data zone 5 in which data is recorded, and an outer guard band 6. A 0th track is formed on the outer circumference of the data zone 5 and a 614th track, for instance, is formed on the inner circumference of the data zone 5. The flotation security zone 2 is divided at angular intervals into a plurality of sectors. A servo zone 8 in which servocontrol data is recorded is formed at the leading end of each sector. The magnetic head reads the servocontrol data recorded in the servo zones 8 during a seek operation to position the magnetic head over a predetermined track.

Referring to FIG. 4, each servo zone 8 is divided into two subzones, namely, a leading zone 9 and a trailing zone 10. Servo data 9a is recorded in the leading zone 9, which is on the leading side of trailing zone 10 with respect to the direction of rotation of the magnetic disk indicated by the arrow R in FIG. 3, and servocontrol data 10a is recorded in the trailing zone 10, which is on the trailing side of leading zone 9 with respect to the direction of rotation of the magnetic disk. The servocontrol data 9a and 10a are recorded alternately in the leading zone 9 and the trailing zone 10 respectively on the opposite sides of the center lines 11a of the corresponding recording tracks 11 in a zigzag arrangement. The servocontrol data 9a and 10a are signals of the same frequency. Signals 12 on the leading side of the servocontrol data 9a has a known AGC (automatic gain control) pattern.

Sometimes, this prior art magnetic disk drive fails to read the servocontrol data recorded on the magnetic disk during a seek operation. If the magnetic disk drive fails to read the servocontrol data, a magnetic head shifting device continues to move (shift) a magnetic head unit on the basis of the servocontrol data read in a preceding magnetic head shifting cycle, so that correct servocontrol operation cannot be achieved. If the failure to read the servocontrol data is temporary and attributable to instantaneous noise, and the servocontrol data can be read correctly immediately after the failure, and no significant problem will occur. However, if the failure to read the servocontrol data occurs repeatedly, then servocontrol of the magnetic head unit is impossible, that is, the magnetic head unit is not decelerated properly as the head approaches the desired track, and as a result, the magnetic head unit collides hard against a stopper. This collision causes the magnetic head to be shaken and can cause damage the magnetic disk.

SUMMARY OF THE INVENTION

The present invention has been made in view of the foregoing problems in the prior art and it is therefore an object of the present invention to provide a magnetic disk drive capable of detecting and inhibiting the uncontrolled movement of the associated magnetic head unit when the servocontrol data cannot be read.

A magnetic disk drive according to one aspect of the present invention comprises: a magnetic disk having a data zone in which recording tracks are formed, and a servo zone in which servocontrol data is recorded; a spindle motor for rotating the magnetic disk; a magnetic head unit for recording data on and reproducing recorded data from the magnetic disk; a magnetic head shifting device for shifting the magnetic head unit in radial directions relative to the magnetic disk; and a voice coil motor for driving the magnetic head shifting device; wherein the voice coil motor is controlled by a control means so as to stop the magnetic head unit in case a failure to read the servocontrol data occurs a predetermined number of times while the magnetic head shifting device is driven during a seek operation.

In seek operation, the control means actuates a read confirmation means to confirm the completion of servocontrol data reading, a magnetic head shifting speed at which the magnetic head unit is shifted by the magnetic head shifting device is stored for each servocontrol data read position in a shifting speed storage means. When the read confirmation means determines that the servocontrol data read operation has failed successively a predetermined number of times, a stopping means is actuated to stop the magnetic head unit by controlling the voice coil motor on the basis of the shifting speed stored in the shifting speed storage means.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
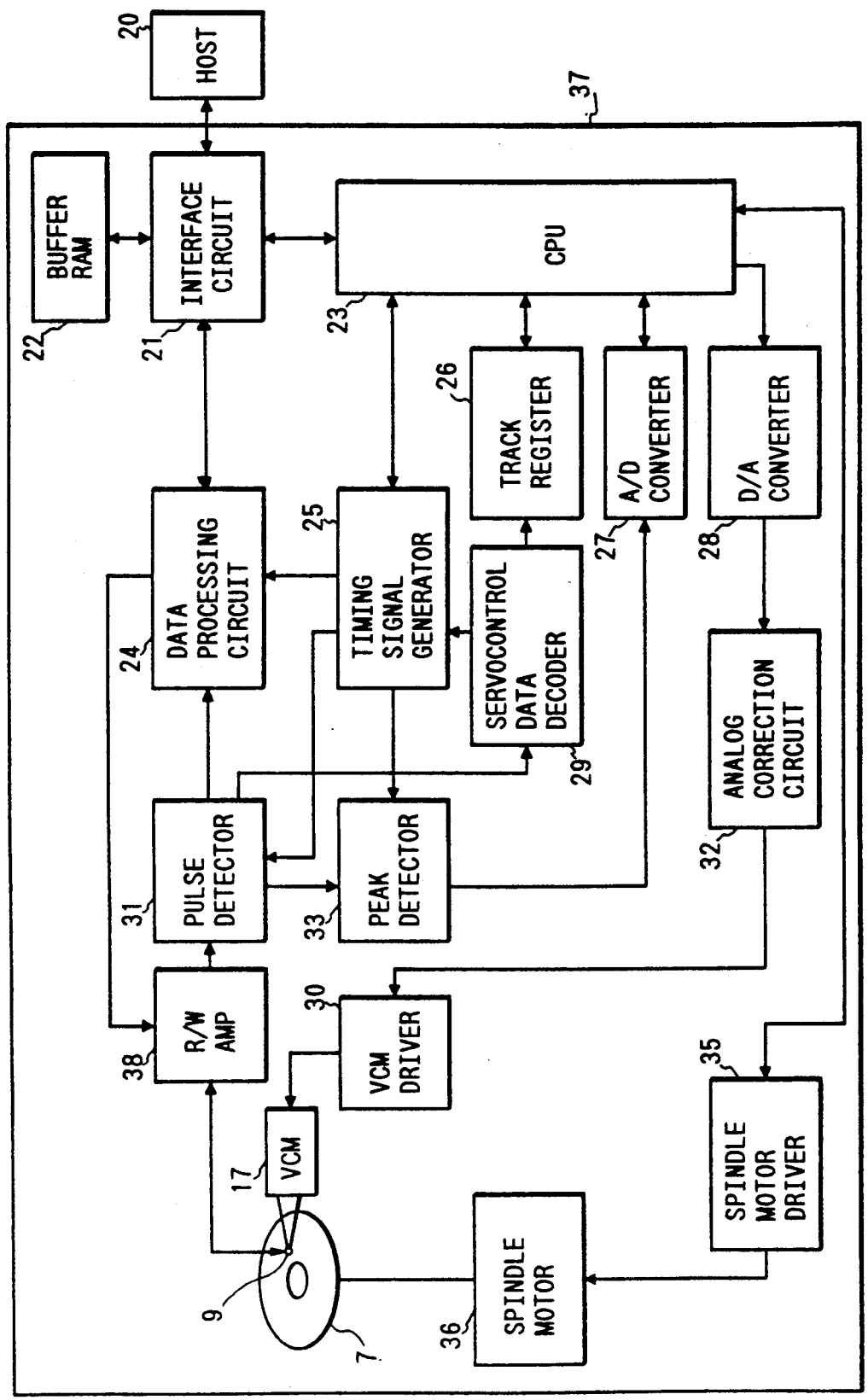
FIGS. 1 is a block diagram of a magnetic disk drive in a preferred embodiment according to the present invention.

Referring to FIG. 1, a magnetic disk drive 37 embodying the present invention is provided with a CPU 23. An interface circuit 21, a timing signal generator 25, a track register 26, an AD converter 27, a DA converter 28 and a spindle motor driver 35 are connected to the CPU 23 for signal exchange. A host computer 20, a buffer RAM 22 and a data processing circuit 24 are connected to the interface circuit 21 for signal exchange. The timing signal generator 25 has output terminals connected to the data processing circuit 24, a pulse detector 31 and a peak detector 33, respectively. The DA converter 28 has an output terminal connected to an analog correction circuit 32, the analog correction circuit 32 has an output terminal connected to a VCM driver 30, and the VCM driver 30 has an output terminal connected to a VCM 17. The spindle motor driver 35 is connected to a spindle motor 36 for driving a magnetic disk 7. Signals are exchanged between the spindle motor driver 35 and the spindle motor 36.

A magnetic head 9 and a read/write amplifier 38 exchange signals. The read/write amplifier 38 is connected to the pulse detector 31 having output terminals connected respectively to the data processing circuit 24, a servocontrol data decoder 29 and the peak detector 33. The data processing circuit 24 has an output terminal connected to the read/write amplifier 38. The servocontrol data decoder 29 has output terminals connected respectively to the track register 26 and the timing signal generator 25. The peak detector 33 has an output terminal connected to the AD converter 27.

In starting the magnetic disk drive 37, the host computer 20 is connected to a power supply. Then, the host computer 20 gives a 0th track restore instruction through the interface circuit 21 to the CPU 23. Upon the reception of the 0th track restore instruction, the CPU 23 gives a restore signal to the DA converter 28. The restore signal is transferred through the analog correction circuit 32 to the VCM driver 30. Then, the VCM driver 30 gives a drive signal to the VCM 17 to locate the magnetic head 9 at a position corresponding to the 0th track.

Figure 2:
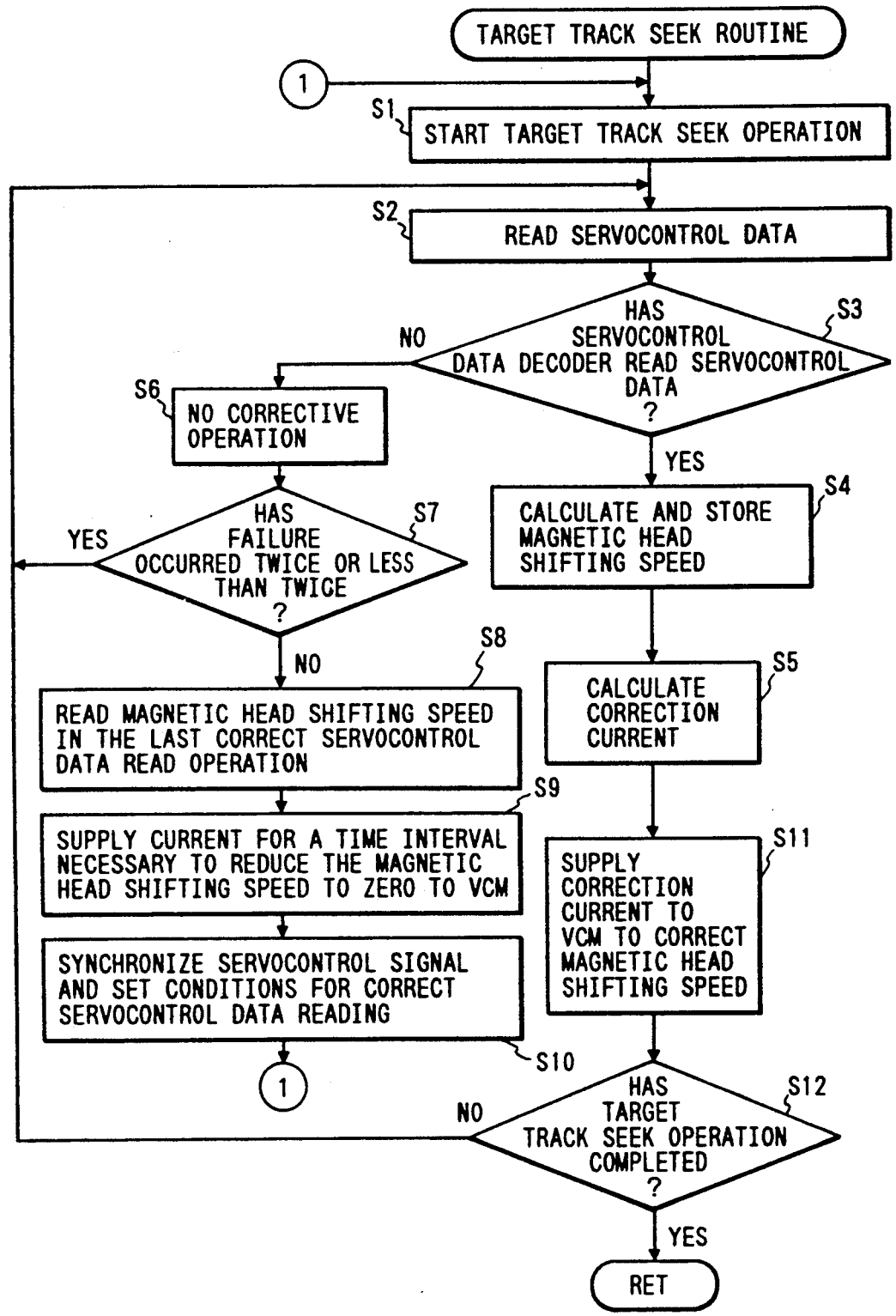
FIG. 2 is a flow chart of assistance in explaining the operation of the magnetic disk drive of FIG. 1.
Figure 3:
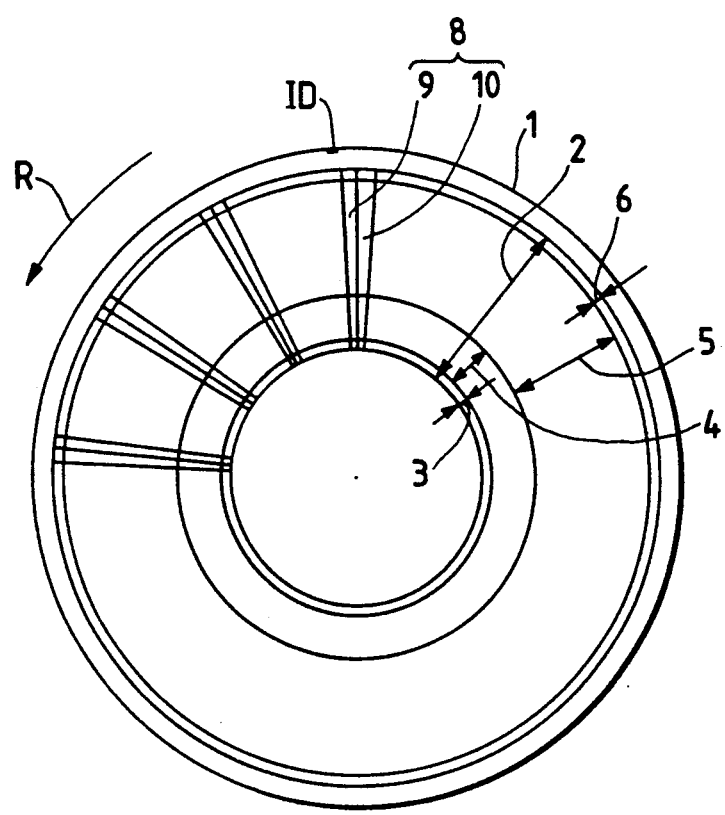
FIG. 3 is a plan view of a magnetic disk included in a conventional magnetic disk drive.
Figure 4:
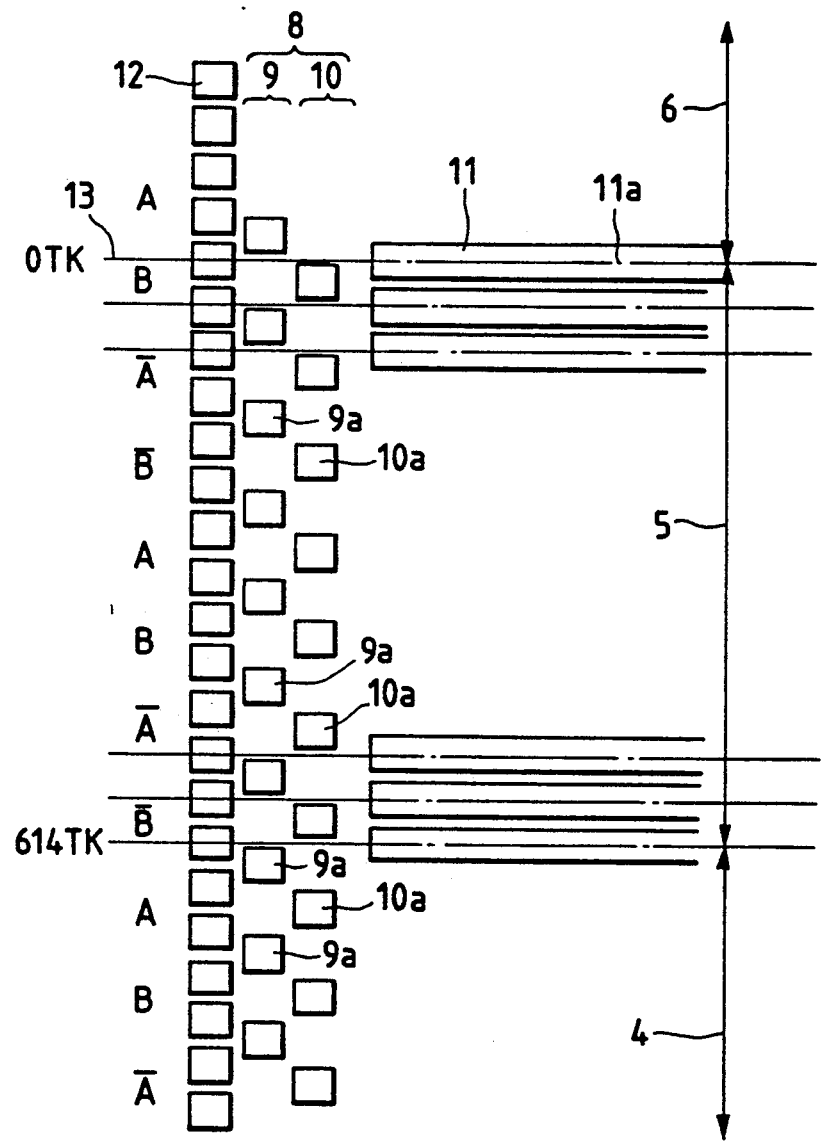
FIG. 4 is a diagrammatic view of assistance in explaining servocontrol data recorded on the magnetic disk of FIG. 3.

Upon the reception of a seek instruction through the interface circuit 21 from the host computer 20, the CPU 23 gives a target track seek signal through the DA converter 28 and the analog correction circuit 32 to the VCM driver 30 in step S1 (FIG. 2). Then, in step S2, the VCM driver 30 supplies a current for seeking a target track to the VCM 17 and, at the same time, the CPU 23 gives a spindle motor drive command signal to the spindle motor driver 35, the spindle motor driver 35 gives a driving signal to the spindle motor 36 to rotate the magnetic disk 7, and the magnetic head 9 reads the servocontrol data from the magnetic disk 7 and provides a servocontrol data signal representing the servocontrol data. The servocontrol data signal is amplified and shaped by the read/write amplifier 38, the pulse detector 31 detects the amplified and shaped servocontrol data signal, the servocontrol data decoder 29 decodes the servocontrol data signal. The decision in step S3 is affirmative when the servocontrol data signal is received by the servocontrol data decoder 29.

In step S4, the output signal of the servocontrol data decoder 29, i.e., a decoded servocontrol data, is transferred through the track register 26 to the CPU 23. Then, the CPU 23 determines the present position of the magnetic head 9 on the basis of the decoded servocontrol data, calculates the present seeking speed on the basis of the data representing the present position of the magnetic head 9 and the data representing the previous position of the same and stores the calculated seeking speed in the storage device. Then, in step S5, the CPU 23 compares the calculated seeking speed with a reference seeking speed to calculate an error speed and determines a speed correction current. In step S11, the speed correction current is supplied to the VCM 17 to correct the seeking speed of the VCM 17. In step S12, a query is made to see if the servocontrol data read by the magnetic head 9 meets a seek end condition. The target track seek operation is terminated if the response in step S12 is affirmative or the routine returns to step S2 to repeat the target track seek operation if the response in step S12 is negative.

If the decision in step S3 is negative, no corrective operation is executed in step S6 and, in step S7, the CPU 23 decides, on the basis of the decoded servocontrol data received through the track register 26, whether or not failure in reading the servocontrol data occurred successively twice or less than twice. If the decision in step S7 is affirmative, the CPU 23 decides that failure in reading the servocontrol data is due to temporary noise. Then, the routine returns to step S2 to repeat the target track seek operation. If the decision in step S7 is negative, the CPU 23 reads the last seek speed from the storage device in step S8 and gives a stop command signal to supply a current for reducing the last seek speed to zero to the coil 41 of the VCM 17. The stop command signal is transferred through the DA converter 28 and the analog correction circuit 32 to the VCM driver 30, and then, in step S9, the VCM driver 30 supplies a current for reducing the shifting speed of the magnetic head 9 to zero to the VCM 17 for a necessary time interval. Consequently, the swing arm is decelerated to a stop to stop shifting the magnetic head 9. In step S10, the CPU 23 synchronizes the servocontrol signal on the basis of the decoded servocontrol data received through the track register and a timing signal received from the timing signal generator 25 to set conditions for the correct reading of the servocontrol data. Then, the routine returns to step S1 to restart the target track seek operation.

Thus, the CPU 23 provides a target track seek operation stop signal to stop the swing arm of the VCM 17 when failure in reading the servocontrol data occurs successively three times. Accordingly, it is possible to prevent damaging the magnetic disk 7 due to the uncontrolled movement of the magnetic head 9 causing the collision of the magnetic head 9 against the stopper and the shake of the magnetic head 9.

Although the invention has been described in its preferred form with a certain degree of particularity, obviously many changes and variations are possible therein. It is therefore to be understood that the present invention may be practiced otherwise than as specifically described herein without departing from the spirit and scope thereof.

What is claimed is:

1. A magnetic disk drive comprising:
 a magnetic disk having a data zone in which data is recorded on recording tracks and a servo zone in which servocontrol data is recorded;
 a spindle motor for rotating the magnetic disk;
 a magnetic head unit for recording data on and reproducing recorded data from the magnetic disk, and for reproducing servocontrol data from the magnetic disk, and generating a corresponding servocontrol data signal;

a magnetic head shifting device for shifting the magnetic head unit radially with respect to the magnetic disk;

a voice coil motor for driving the magnetic head shifting device; and a control means comprising:

means for receiving the servocontrol data signal from the magnetic head unit, means for determining if the magnetic head unit failed to read the servocontrol data correctly based on the received servocontrol data signal, means for counting a number of successive determined failures of the magnetic head unit to read the servocontrol data, and means for transmitting a stop signal to the voice coil motor so as to decelerate the magnetic head shifting device to a stop when the counted number of successive determined failures to read the servocontrol data exceeds a predetermined number.

2. A magnetic disk drive comprising:

a magnetic disk having a data zone in which data is recorded on recording tracks and a servo zone in which servocontrol data is recorded;

a spindle motor for rotating the magnetic disk;

a magnetic head unit for recording data on and reproducing recorded data from the magnetic disk, and for reading the servocontrol data from the magnetic disk and generating a servocontrol data signal;

a magnetic head shifting device for shifting the magnetic head unit radially of the magnetic disk; and a voice coil motor for driving the magnetic head shifting device;

wherein a control means receives the servocontrol data signal from the magnetic head unit and transmits a stop signal to the voice coil motor so as to decelerate the magnetic head shifting device to a stop if the magnetic head unit fails to read the servocontrol data a predetermined number of successive attempts while the magnetic head shifting device is being driven for target track seek operation, and wherein said control means has a storage means storing magnetic head shifting speed data, and said control means controls the driving operation of said magnetic head shifting device according to the magnetic head shifting speed data to decelerate said magnetic head unit to a stop.

* * * * *